United States Patent
Brownewell et al.

(10) Patent No.: US 9,875,374 B2
(45) Date of Patent: Jan. 23, 2018

(54) SYSTEM AND METHOD FOR COLLECTING, STORING, AND SECURING DATA

(71) Applicants: Michael L. Brownewell, Deer Park, WA (US); Jason M. Musselman, Citrus Heights, CA (US)

(72) Inventors: Michael L. Brownewell, Deer Park, WA (US); Jason M. Musselman, Citrus Heights, CA (US)

(*) Notice: Subject to any disclaimer, the term of this patent is extended or adjusted under 35 U.S.C. 154(b) by 94 days.

(21) Appl. No.: 15/200,358

(22) Filed: Jul. 1, 2016

(65) Prior Publication Data

US 2017/0005803 A1 Jan. 5, 2017

Related U.S. Application Data

(60) Provisional application No. 62/187,650, filed on Jul. 1, 2015.

(51) Int. Cl.
| | |
|---|---|
| *G06F 21/62* | (2013.01) |
| *H04L 29/06* | (2006.01) |
| *G06F 17/30* | (2006.01) |
| *G06F 21/60* | (2013.01) |

(52) U.S. Cl.
CPC .... *G06F 21/6218* (2013.01); *G06F 17/30289* (2013.01); *G06F 17/30424* (2013.01); *G06F 17/30554* (2013.01); *G06F 17/30592* (2013.01); *G06F 21/602* (2013.01); *G06F 21/6209* (2013.01); *H04L 63/0428* (2013.01); *H04L 63/06* (2013.01)

(58) Field of Classification Search
CPC .................................................. G06F 21/6218
See application file for complete search history.

(56) References Cited

U.S. PATENT DOCUMENTS

| | | | |
|---|---|---|---|
| 7,594,082 B1 * | 9/2009 | Kilday | G06Q 10/107 711/154 |
| 7,818,300 B1 * | 10/2010 | Kilday | G06Q 50/18 707/662 |

(Continued)

OTHER PUBLICATIONS

Hasan et al.; Trustworthy vacuuming and litigation holds in long-term high-integrity records retention; Published in: Proceeding EDBT '10 Proceedings of the 13th International Conference on Extending Database Technology; 2010; pp. 621-632; ACM Digital Library.*

(Continued)

*Primary Examiner* — Bradley Holder
(74) *Attorney, Agent, or Firm* — Hovey Williams LLP

(57) ABSTRACT

A computer system for collecting, securing, storing, retrieving, and disposing data includes an input that receives data from one or more data capture devices, a staging server, a data storage system, and a presentation system. The data capture devices may capture data and transmit it to the staging server via the input. The staging server encrypts the data and transmits it to the data storage system. The data storage system is configured to store the data for a predetermined retention period, and if the data has a legal hold, the data storage system will safely secure the data until the hold is lifted. The presentation system is configured to communicate with the data storage system to request and access data for an authorized user.

21 Claims, 5 Drawing Sheets

(56) References Cited

U.S. PATENT DOCUMENTS

| | | | |
|---|---|---|---|
| 8,484,737 B1* | 7/2013 | Swift | H04L 63/1441 |
| | | | 709/224 |
| 8,527,468 B1* | 9/2013 | Crafford | G06F 17/30011 |
| | | | 707/662 |
| 8,984,031 B1* | 3/2015 | Todd | G06F 17/30312 |
| | | | 707/823 |
| 9,613,038 B2* | 4/2017 | Factor | G06F 17/30085 |
| 2005/0125411 A1* | 6/2005 | Kilian | G06F 17/30551 |
| 2005/0160061 A1* | 7/2005 | Todd | G06F 17/30085 |
| 2005/0160120 A1* | 7/2005 | Todd | G06F 17/30085 |
| 2008/0172563 A1* | 7/2008 | Stokes | G06F 21/80 |
| | | | 713/193 |
| 2008/0263108 A1* | 10/2008 | Herbst | G06F 17/30085 |
| 2008/0263565 A1* | 10/2008 | Luther | G06F 17/30368 |
| | | | 719/316 |
| 2009/0094228 A1* | 4/2009 | Bondurant | G11L 319/02 |
| 2009/0119469 A1* | 5/2009 | Dellantoni | G06F 21/10 |
| | | | 711/166 |
| 2009/0150168 A1* | 6/2009 | Schmidt | G06Q 10/10 |
| | | | 705/311 |
| 2009/0150431 A1* | 6/2009 | Schmidt | G06F 17/30595 |
| 2009/0150866 A1* | 6/2009 | Schmidt | G06Q 50/18 |
| | | | 717/120 |
| 2010/0306283 A1* | 12/2010 | Johnson | G06F 17/30085 |
| | | | 707/803 |
| 2011/0320494 A1* | 12/2011 | Fisher | G06F 17/30011 |
| | | | 707/780 |
| 2012/0023145 A1* | 1/2012 | Brannon | G06F 17/30082 |
| | | | 707/822 |
| 2012/0084524 A1* | 4/2012 | Gokhale | G06F 17/30466 |
| | | | 711/162 |
| 2013/0198474 A1* | 8/2013 | Shaath | G06F 12/1466 |
| | | | 711/163 |
| 2014/0082749 A1* | 3/2014 | Holland | G06F 21/645 |
| | | | 726/29 |
| 2015/0134619 A1* | 5/2015 | Factor | G06F 17/30085 |
| | | | 707/663 |
| 2015/0134628 A1* | 5/2015 | Hu | G06F 17/30289 |
| | | | 707/694 |
| 2017/0235848 A1* | 8/2017 | Van Dusen | G06F 17/30979 |
| | | | 705/12 |

OTHER PUBLICATIONS

Heikkila; E-Discovery: Identifying and Mitigating Security Risks during Litigation; Published in: IT Professional (vol. 10, Issue: 4, Jul.-Aug. 2008); IEEE Xplore.*

* cited by examiner

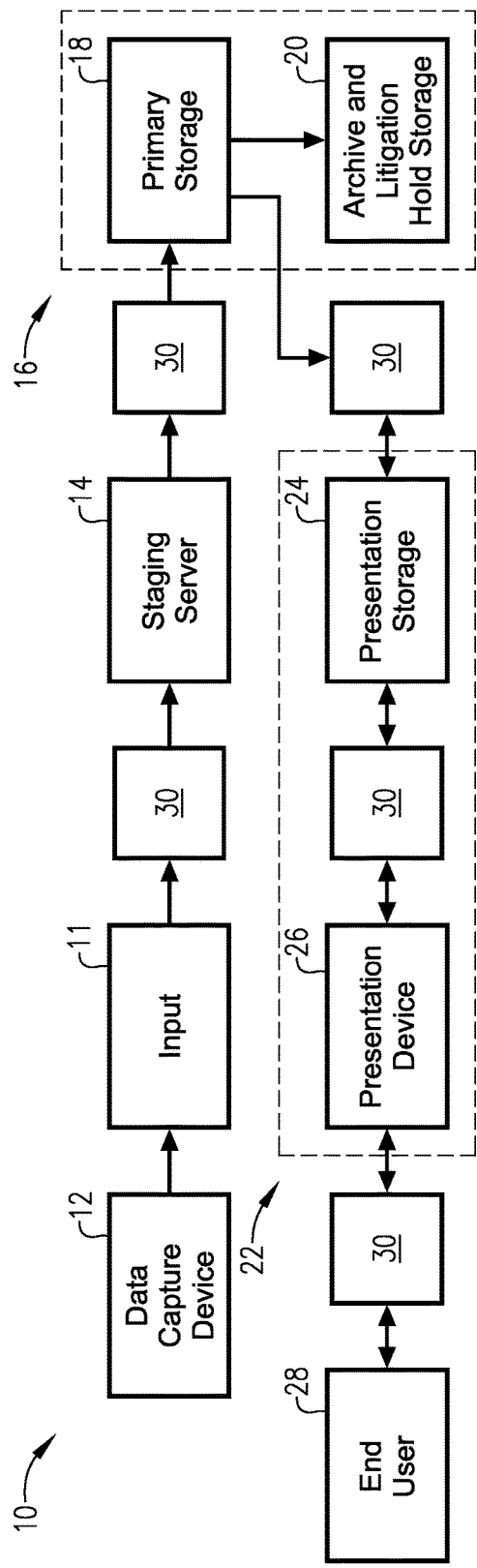
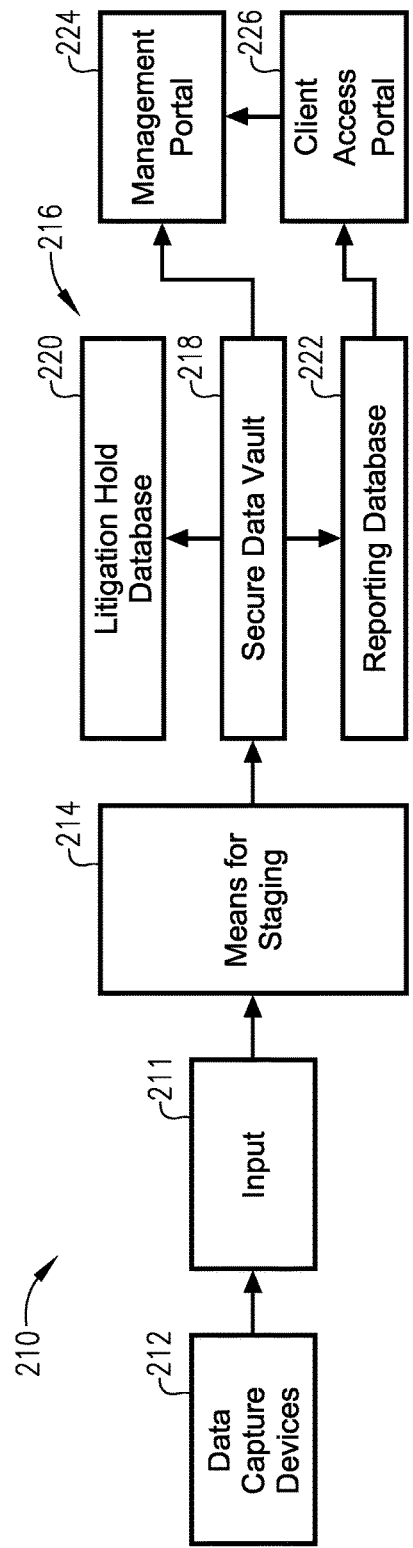
FIG. 1
FIG. 2

US 9,875,374 B2

SYSTEM AND METHOD FOR COLLECTING, STORING, AND SECURING DATA

RELATED APPLICATIONS

This patent application is a non-provisional regular utility patent application and claims priority benefit with regard to all common subject matter of U.S. Provisional Patent Application Ser. No. 62/187,650, filed on Jul. 1, 2015, and entitled ENABLING DATA GENERATION STORAGE AND $3^{RD}$ PARTY CERTIFICATION. The identified earlier-filed provisional patent application is hereby incorporated by reference in its entirety into the present application.

BACKGROUND

The present invention relates to the field of information technology. More particularly, the invention relates to systems and methods of collecting, storing, and securing digital data used for secure storage of business records, legal records, personal records, pictures, videos, audio files, and other data.

Ever increasing amounts of data are generated by mobile phones, cameras, computers, sensors, and the like. Such data is often vital to a person, a company's business, or a court case. However, data is often lost due to malfunctioning hardware and software, spoliation by bad actors attempting to cover up incriminating data, and human error. Other data is not so vital and merely takes up space and distracts from the protection of more vital data. Accordingly, there is a need for an improved data collecting, storing, and securing system and method that overcomes the limitations of the prior art.

SUMMARY

The present invention solves the above-described problems and provides a distinct advance in the art of secure data storage. More particularly, the present invention provides a computer system that collects, stores, certifies, retrieves, and disposes data so as to improve operation of the computer system.

A computer system constructed in accordance with one embodiment of the present invention broadly includes an input or input processing application that receives data from one or more registered data capture devices, a staging server, a presentation system, and a data storage system.

The registered data capture device is configured to capture data from a variety of sources including meetings, events, computers, sensors, and the like. The registered data capture devices may be any electronic devices such as sensors, cameras, microphones, smartphones, tablet computers, laptop computers, desktop computers, wearables, or the like. The input or input processing application is configured to receive data from the data capture devices and transmit the data to the staging server.

The staging server is configured to receive the data from the input or input processing application, verify that each data capture device is registered, assign a signature and an internal data hash to the data, encrypt the data and the internal data hash using an encryption key associated with the registered data capture device, and transmit the encrypted data and internal data hash using transit encryption and verifies the transmission hash to ensure proper transmission of the encrypted data.

The presentation system is configured to receive a data request from an authorized user, encrypt the data request using an encryption key associated with the authorized user, transmit the encrypted data request, receive encrypted requested data, and decrypt the encrypted requested data using the decryption key associated with the authorized user.

The data storage system is configured to receive the encrypted data and internal data hash from the staging server, decrypt the encrypted data and internal data hash using a decryption key associated with the data capture device, verify that the transmission hash matches the hash of the incoming data stream, and store the data. The data storage system may also be configured to receive the encrypted data request from the presentation system, decrypt the data request using a decryption key associated with the authorized user, retrieve requested data, assign an internal requested data hash to the requested data, encrypt the requested data and the internal requested data hash using the encryption key associated with the authorized user, and transmit the encrypted requested data and internal requested data hash using transit encryption and verifies the transmission hash to ensure proper transmission of the encrypted data.

The computer system may also include an automatic disposal system that disposes of data that does not have a legal hold and of which the data retention period has expired.

Another embodiment of the present invention is a method of collecting, storing, certifying, and retrieving data. The method includes the steps of receiving data from one or more data capture devices, assigning a signature and an internal data hash to the data, and parsing the data into metadata. The method also includes the steps of encrypting the data, metadata, and the internal data hash using an encryption key associated with the registered data capture device and transmitting the encrypted data, metadata, and internal data hash using transit encryption and verifies the transmission hash to ensure proper transmission of the encrypted data. The method also includes the step of decrypting the encrypted data, metadata, and internal data hash using a decryption key associated with the data capture device, verifying that the transmission hash is uncorrupted to ensure integrity of the encrypted data, and aggregating the metadata.

The method also includes the steps of storing the data and metadata using modern database techniques and processes, storing the aggregated metadata using modern business intelligence techniques and processes, archiving the data using modern database techniques and processes, the metadata using modern database techniques and processes, and the aggregated metadata using modern business intelligence techniques and processes. The method includes analyzing the metadata for industry trending and auditing, and archiving the data, metadata, and aggregated metadata that has a legal hold. The method also includes verifying that a data request is from an authorized user, verifying that the data request is a valid data request, encrypting the valid data request using an encryption key associated with the authorized user, decrypting the valid data request using a decryption key associated with the authorized user, and retrieving the requested data and metadata. The method also includes the steps of encrypting the requested data, metadata, and the internal requested data hash using the encryption key associated with the authorized user and transmitting the encrypted requested data, metadata, and internal requested data hash using transit encryption and verifies the transmission hash to ensure proper transmission of the encrypted data. The method further includes the steps of decrypting the encrypted requested data and metadata using the decryption key associated with the authorized user and displaying the requested data and metadata.

The system and method of the present invention provide numerous advantages. For example, the system allows data to be collected and stored in a more secure fashion. The data can be certified and admissible in court systems because the data is secured in a manner that satisfies various industry standards and rules of evidence. The data can also be used to discover industry trends and be used for auditing purposes. Further, data can be automatically held when there is a notice of litigation, or automatically erased when relevant statutes of limitation have expired or when standard data retention periods have expired.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 1 is a schematic view of a system for collecting, securing, storing, retrieving, and disposing data in accordance with an embodiment of the present invention.

FIG. 2 is a schematic view of a system for collecting, securing, storing, retrieving, and disposing data in accordance with another embodiment of the present invention.

Figure 3:
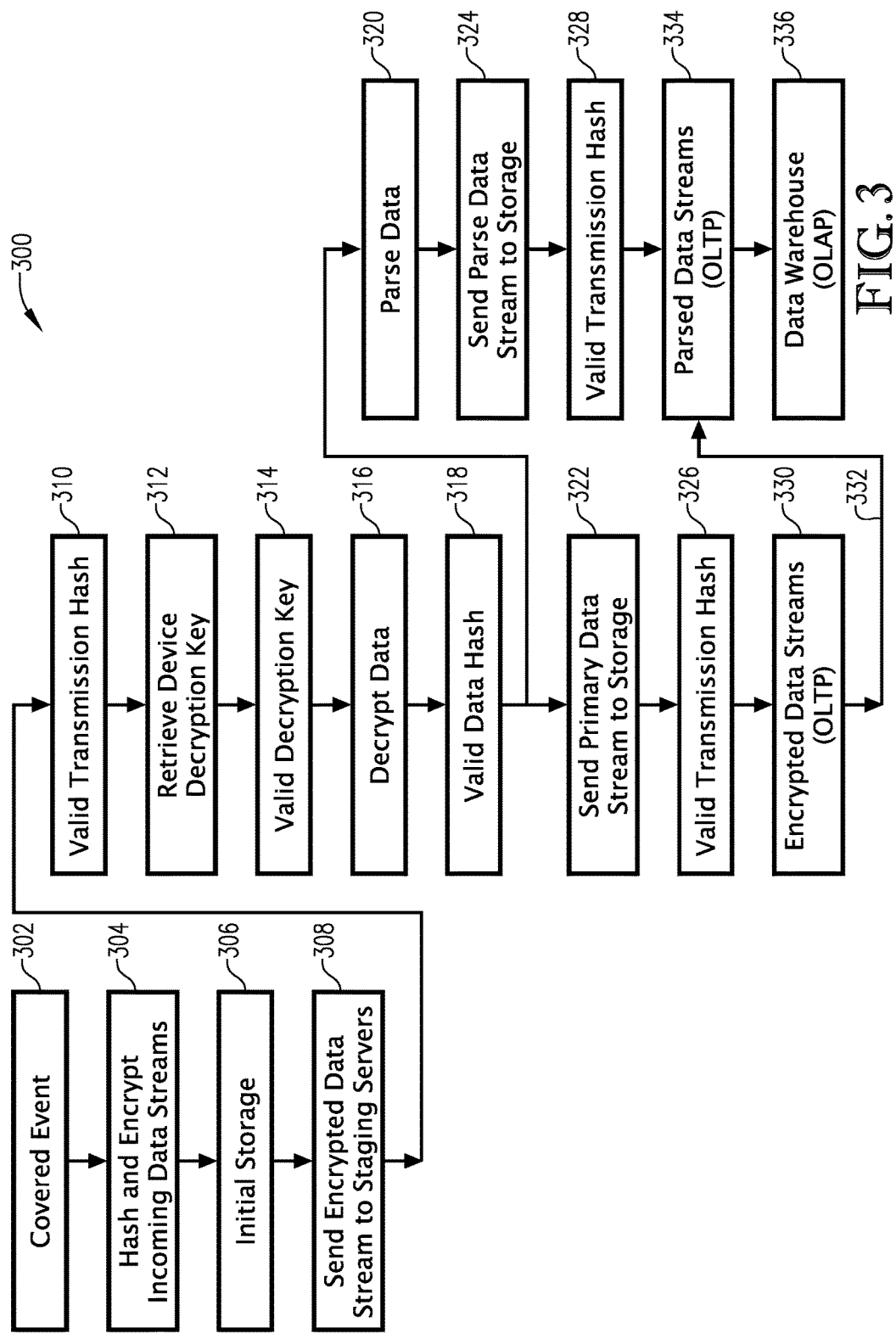
FIG. 3 is a flow chart depicting selected steps in a method of collecting, securing, and storing data in accordance with an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawing figures, and particularly FIG. 1, a system 10 constructed in accordance with a preferred embodiment of the invention is illustrated. The system 10 is provided for collecting, storing, certifying, and retrieving data and broadly includes an input 11 that receives data from one or more data capture devices 12, a staging server 14, a data storage system 16, a primary storage 18, an archive and litigation hold storage 20, a presentation system 22, a presentation storage 24, and a presentation device 26.

The data which is collected, stored, certified, and retrieved with the present invention may include data representative of documents, pictures, sensor data, GPS tracking, diagrams, notes, forms, phone calls, voicemails, credit card transactions, biometric data, audio files, video files, or the like. The data can be captured live or previously recorded. The event, data, or the like may be compliant with local or Federal rules of evidence, industry standards, or any other relevant standard. For example, the event or data may be the kind of event or data described in FRE §§803(6) and 902 such that the data may be admissible in a court proceeding.

The input 11 may be a USB port, an Ethernet connection, fiber optic port, electric wire input, bus connection, serial or parallel link connection or harness, universal bus connection, address bus connection, data bus connection, a wireless radio frequency (RF) communication component utilizing RF standards such as cellular 2G, 3G, or 4G, Institute of Electrical and Electronics Engineers (IEEE) 802.11 standard such as WiFi, IEEE 802.16 standard such as WiMAX, Bluetooth™, other similar types, or combinations thereof. The input 11 may further be an input processing application.

The data capture device 12 may be a mobile device, smart device, computer, camera, smartphone, tablet, or the like. The data capturing device 12 may include a human interactive device (HID), an autonomous data feed (ADF), or the like. The HID device may include smartphones, tablets, cellphones, video glasses, credit card devices, keyboards, and the like. The ADF device may include biometric, mechanical, and environmental sensors, as well as video and audio recording devices such as security cameras, microphones, recorders, dashboard cameras, and other devices designed to record and send data without human interaction. The data capture device 12 can also include drones or other types of remote recording and collecting devices.

The system 10 may include any number of data capture devices 12. In some embodiments, the input 11 may be integrally part of the data capture device 12. In one embodiment, each data capture device 12 comprises a data capturing element, a memory element, a communication element, and a processing element. The system 10 may be compliant with local or Federal rules of evidence, industry standards, or any other relevant standard. For example, the data may be stored by a third party custodian in accordance with Federal Rules of Evidence (FRE) §§803(6) and 902 such that the data is admissible in a Federal court proceeding.

The data capture element may be any type of sensor or input device that captures or receives data. This includes keyboards, touch screens, sensors, cameras, microphones, and the like.

The processing element can include processors, microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element may generally execute, process, or run instructions, code, code segments, software, firmware, programs, applications, apps, processes, services, daemons, or the like. The processing element may also include hardware components such as finite-state machines, sequential and combinational logic, and other electronic circuits that can perform the functions necessary for the operation of the current invention. The processing element can be a computer having any of the aforementioned devices or circuits.

The memory element can include read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element may be embedded in, or packaged in the same package as, the processing element. The memory element may include, or may constitute, a "computer-readable medium". The memory element can also be specialized to be robust and durable in that it is resistant to shock, water damage, and electromagnetic interference.

The encryption and hashing method utilized by the processing element can be any relevant encryption standard, including Field Information Processing Standard (FIPS) 140, currently accepted Secure Hash Algorithms (SHA), current Elemented States encryption standards, or any other acceptable standard. The encryption can be done using a device encryption key, or encryption key unique to the registered device, that was assigned by a central key management system.

The communication element can be any form of communication device that sends information, including a device that sends information through wired or wireless coupling, as described above. The communication element can use transit encryption that also complies with FIPS 140, or other relevant encryption standards, having a transmission hash. The transmission may also use secure internet protocol security (IPsec) enabled transmission channels or SSH/VPN encrypted tunnel, or the like. The communication element can also use certificate-based tunneling to secure traffic between the data capture device 12 and the staging server 14.

The data capturing element, processing element, memory element, and communication element may be wired or wirelessly coupled together. Wired coupling can include fiber optic coupling, electric wires, busses, serial or parallel links, universal busses, address busses, data busses, control lines, or the like. Wireless coupling can include as wireless radio frequency (RF) communication components utilizing RF standards such as cellular 2G, 3G, or 4G, Institute of Electrical and Electronics Engineers (IEEE) 802.11 standard such as WiFi, IEEE 802.16 standard such as WiMAX, Bluetooth™, other similar types, or combinations thereof.

The data capture device 12 may be wired or wirelessly connected to the staging server 14.

The staging server 14 can be a desktop computer, laptop, or the like, or embodied by application servers, database servers, file servers, gaming servers, mail servers, print servers, web servers, or the like, or combinations thereof. Furthermore, the staging server may include a plurality of servers, virtual servers, or combinations thereof. More specifically, the staging server 14 may include a communication element, a memory element, and a processing element. The staging 14 server may be configured to include and/or execute server computer programs, such as file storage applications, database applications, email or messaging applications, web server applications, or the like. The staging server 14 may apply business methods or algorithms, may utilize lookup tables or databases, or combinations thereof. The staging server 14 may be further associated with a database, which may be associated with the memory element, for maintaining and storing existing data, information about registered data capture devices, or other relevant information. The staging server 14 may be wired or wirelessly connected to the data storage system 16.

The data storage system 16 may broadly comprise a primary storage 18 and an archive and litigation hold storage 20. The primary storage 18 and the archive and litigation hold storage 20 may each broadly comprise a memory element, a processing element, and a communication element, similar to those described above. The primary storage 18 and the archive and litigation hold storage 20 may be wired or wirelessly communicably coupled. The primary storage 18 and the archive and litigation hold storage 20 may also be a server or plurality of servers, like those described above. The primary storage 18 and the archive and litigation hold storage 20 may also be controlled by a disinterested third party and kept in facilities that are both physically and electrically secure to ensure the safe storage of the data. The data storage system 16 may be wired or wirelessly communicably connected to the presentation system 22.

The presentation system 22 may broadly comprise a presentation storage 24 and a presentation device 26. The presentation storage 24 and the presentation device 26 may each broadly comprise a memory element, a processing element, and a communication element, similar to those described above. The presentation storage 24 and the presentation device 26 may be wired or wirelessly coupled. The presentation storage 24 may also be servers, like those described above. The computer system 10 may be configured to have a plurality of firewalls 30 dispersed throughout the system for added security.

In the embodiment illustrated in FIG. 1, the data capture device 12 can be a device registered with the system 10. The data received or captured can be of an event or type thereof that is also registered with the system 10. The data capture device 12 can be configured to receive or capture the data. The data capture device 12 can be configured to hash the data and encrypt the hash and data and send it to the input 11.

The staging server 14 may be configured to receive the transmission from the data capture device 12 via the input 11. The staging server 14 may also receive a decryption key from a key management system. The key management system may be a system operated by an offsite, disinterested third party. The staging server 14 may send information regarding the data capture device 12 to the key management system in order to retrieve the decryption key associated with that device 12. The staging server 14 may be configured to decrypt the encrypted data and internal data hash using the decryption key provided by the key management system. The staging server 14 may then verify that the transmission hash is uncorrupted. If the staging server 14 detects that data was lost, the staging server 14 may then request re-transmission of the data. The staging server 14 may also be configured to verify that the decryption key matches the data capture device 12. If the decryption key does not match the data capture device 12, or if the data capture device 12 does not have an assigned key, or if the transmission encryption key and decryption key are not paired, the incident may be logged, and the staging server 14 may transmit an alert to an administrator and store the data in an alternate storage device. The administrator may then investigate the data and event. If all the data is in the transmission, then the staging server 14 may store the data locally according to the standard provided by FIPS 140 or the current U.S. encryption standard. The staging server 14 may also be configured to parse the data into demographic and other data warehousing information cubes, or metadata, for the purpose of industry trending and auditing. The staging server 14 may also be configured to encrypt the data, metadata, and internal data hash using the encryption key associated with the data capture device 12, and transmit the encrypted data, metadata, and internal data hash using encrypted transmission, having a transmission hash, to the data storage system 16.

The data storage system 16 may be configured so that the primary storage 18 receives the transmission from the staging server 14. The primary storage 18 may be configured to verify the incoming data stream transmission hashes to ensure against loss of data integrity during transmission. The primary storage 18 may be configured to decrypt the data and metadata using the decryption key associated with the data capture device 12 provided by the key management system. The primary storage 18 may be configured to aggregate the data or the metadata. The primary storage 18 may also be configured to receive litigation hold notifications from users or administrators. The primary storage 18 can hash, encrypt (using an encryption key associated with the data capture device 12 and provided by the key management system), and transmit the data and/or the metadata to the archive and litigation hold storage 20 or the presentation system 22. The primary storage 18 may transmit data and metadata to the archive and litigation hold storage 20 for purposes of archiving the data and the metadata or holding the data and the metadata that have a litigation hold. The litigation hold may require the data or the metadata to be preserved in anticipation of a legal proceeding. The primary storage 18 may also be configured to aggregate the data or the metadata and hash, encrypt, and transmit the aggregated data or metadata to the presentation system 22. The archive and litigation storage 20 may be at a secure, offsite location. The data storage system 16 may be configured to store the data, the metadata, or the aggregated metadata using online transaction processing (OLTP), online analytical processing (OLAP), modern database techniques and processes, or modern business intelligence techniques and processes.

The presentation system 22 can be configured so that the presentation storage 24 receives the encrypted data, the metadata, or the aggregated metadata from the primary storage 18. The presentation device 26 may be configured to receive data requests from an end user 28. The end user 28 must be a valid, licensed, or permitted user, and must submit a valid or authorized data request through the presentation device 26. The presentation device 26 may transmit the data requests to the presentation storage 24. The presentation storage 24 may be configured to encrypt, hash, and transmit the data request to the data storage system 16. The presentation storage 24 may be configured to encrypt the data request using an encryption key associated with the end user 28 provided by the key management system. The data storage system 16 may be configured to receive the encrypted data request and decrypt it using a decryption key from the key management system, wherein the decryption key is associated with the end user 28. The data storage system 16 may then retrieve requested and permitted data, metadata, or aggregated metadata from the primary storage 18 or the archive and litigation hold storage 20. The data storage system 16 may then encrypt the requested data, metadata, or aggregated data and transmit it using encrypted transmission to the presentation system 22. The presentation storage 24 may be configured to receive and decrypt the requested data, metadata, or aggregated metadata using the decryption key associated with the end user 28. The presentation storage 24 may then send the requested data, metadata, or aggregated metadata to the presentation device 26. The presentation device 26 may then be configured to display the requested data, metadata, or aggregated metadata for only the user 28 to see.

The presentation system 22 may be configured to track all data requests, data request attempts, and information related thereto, such as location, time, internet protocol (IP) address, or the like, of the data request attempts. In some embodiments, the presentation system 22 may be configured to allow the user to modify the data, metadata, or aggregated metadata, wherein the original copies are not modified, but the modifications may be tracked, stored, and placed on new versions of the original. The presentation system 22 may be configured to transmit the modified versions of the data, metadata, or aggregated metadata to the data storage system 16. The computer system 10 may be configured to have a plurality of firewalls 30 to prevent hacking, cracking, fraudulent use, or the like from affecting the data or infiltrating the system 10. The primary storage 18 may also be configured to transmit data, metadata, or aggregated metadata to a court when required by encrypting the data, metadata, or aggregated metadata with an encryption key associated with the court.

A system 210 constructed in accordance with an alternative embodiment of the invention is illustrated in FIG. 2. The computer system 210 comprises an input 211 connected to data capture devices 212, a means for staging 214, a data storage system 216, a management portal 224, and a client access portal 226. The data capture devices 212 can be any of the devices 12 described above and wired or wirelessly communicably connected to the means for staging 214 via the input 211. The means for staging 214 may be similar to the staging servers 14 described above and some embodiments may be a part of the data capture devices 212. The means for staging 214 may be wired or wirelessly communicably connected to the data storage system 216. The data storage system 216 may be similar to the data storage system 16 described above and may include a secure data vault 218, a litigation hold database 220, and a reporting database 222. The secure data vault 218 may be wired or wirelessly communicably connected to the litigation hold database 220, reporting database 222, and the management portal 224. The reporting database 224 may be wired or wirelessly communicably connected to the client access portal 226, and the client access portal 226 may be wired or wireless communicably connected to the management portal 224. The management portal 224 and client access portal 226 may be computers, mobile devices, tablets, internet applications, mobile applications, or non-transitory computer readable storage mediums having executable computer programs thereon.

The computer programs of the present invention may comprise an ordered listing of executable instructions for implementing logical functions in a computer or processor. The computer programs can be embodied in any computer-readable medium for use by or in connection with an instruction execution system, apparatus, or device, and execute the instructions. In the context of this application, a "computer-readable medium" can be any physical medium that can contain, store, communicate, propagate, or transport the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), a portable compact disk read-only memory (CDROM), an optical fiber, multi-media card (MMC), reduced-size multi-media card (RS MMC), secure digital (SD) cards such as microSD or miniSD, and a subscriber identity module (SIM) card, and/or other memory elements.

The data capture devices 212 are configured to capture data and transmit it to the means for staging 214 via the input 211. The means for staging 214 is configured to attach a data stamp to the data, which may include GPS, date, time, or data capture device 212 identification. The means for staging 214 may also be configured to perform signature hashing. The data is then encrypted and transmitted to the secure data vault 218. The secure data vault 218 may be configured to decrypt the data, parse the data into metadata, store the data or metadata, and send the data or metadata to the litigation hold database 220, reporting database 222, or management portal 224.

The management portal 224 may be configured to allow a disinterested third party to access data or metadata in a read-only format by making a valid data request and sending it to the secure data vault 218. The secure data vault 218 may be configured to verify the authorization of the request, retrieve the data, and transmit it to the management portal 224. The management portal 224 may then display the data or metadata for authorized personnel of the disinterested third party to view the data or metadata. The client access portal 226 may be configured to allow an authorized user to submit a data request. The client access portal 226 may transmit the request to the reporting database 222, which transmits the request to the secure data vault 218. The secure data vault 218 may encrypt and send the requested data to the reporting database 222. The reporting database 222 may then be configured to encrypt and transmit the requested data or metadata to the client access portal 226. The client access portal 226 may be configured to decrypt the requested data or metadata and display the data or metadata for the user.

The flow chart of FIG. 3 depicts the steps of an exemplary method 300 for collecting, storing, and securing data using the system 10 to allow for efficient storage and high security of the data. The method 300 may be compliant with local or Federal rules of evidence, industry standards, or any other relevant standard. For example, the data may be stored in accordance with Federal Rules of Evidence (FRE) §§803(6) and 902 such that the data is admissible in a Federal court.

In some alternative implementations, the functions noted in the various blocks may occur out of the order depicted in FIG. 3. For example, two blocks shown in succession in FIG. 3 may in fact be executed substantially concurrently, or the blocks may sometimes be executed in the reverse order depending upon the functionality involved. Some or all of the steps described below and illustrated in FIG. 3 may also represent executable code segments stored on a computer-readable medium described above and/or executable by a computer or processor.

The method 300 may comprise a step of collecting data or receiving data on an event covered by a user's license, as depicted in block 302. The data can be of any type described above and the event can be a meeting, a deposition, or the like. The data may also include assigning a stamp having a data, time, location, or other information about the event. The event, data, or the like may be compliant with local or Federal rules of evidence, industry standards, or any other relevant standard. For example, the event or data may be the kind of event or data described in FRE §§803(6) and 902. Next, the method 300 may include a step of hashing and encrypting the data using an encryption key associated with the data capture device 12, as depicted in block 304. The encryption key may be provided by the key management system. The hashing may include assigning an internal data hash. The hashing and encrypting may be performed by the data capture device 12. Next, the method 300 may include a step of initially storing the data on the data capture device 12, as depicted in block 306. Next, the method 300 may include a step of sending the encrypted data stream to the staging server 14, as depicted in block 308. The sending of the encrypted data may be accomplished via encryption methods described above, and may include assigning a transmission hash that matches the internal data hash.

Next, the method 300 may include a step of verifying that the transmission hash is valid and uncorrupted, as depicted in block 310. The verification may be performed by the staging server 14. The staging servers 14 may request re-transmission if any data is lost. Next, the method 300 may include a step of retrieving a decryption key associated with the data capture device 12, as depicted in step 312. The decryption key may be provided by the key management system. Next, the method 300 may include a step of validating the decryption key, as depicted in block 314. The staging server 14 may be configured to verify that the decryption key matches the data capture device 12. If the data capture device 12 does not have an assigned key, or if the transmission encryption key and decryption key are not paired, the incident may be logged, and the disinterested third party may be alerted for investigation. The incoming data may be stored in an alternative storage. Next, the method 300 may include a step of decrypting the data, as depicted in block 316. If the decryption key matches, the data is decrypted by the staging server 14. Next, the method 300 may include a step of validating the internal data hash, as depicted in block 318. The staging server 14 may verify that the internal data hash matches the transmission data hash to ensure that no change has occurred due to transmission or encryption.

Next, the method 300 may include a step of parsing a copy of the decrypted data into demographic and other data warehousing information cubes, or metadata, for the purposes of industry trending and auditing, as depicted in block 320. Next the method 300 may include steps of transmitting the data and metadata to the primary storage 18, as depicted in blocks 322 and 324, respectively. Next, the method 300 may include steps of validating the transmission hashes of the data and metadata, as depicted in blocks 326 and 328, respectively. The primary storage 18 may be configured to verify that the internal data hashes of the data and metadata match their respective hashes after transmission. Next, the method 300 may include a step of storing the data using OLTP, as depicted in block 330. The data may also have a reference link 332 to its associated metadata. The data may be retrieved later for court admission or administrative reporting. Next, the method 300 may include a step of storing the metadata for auditing, tracking, and information retrieval, as depicted in block 334. Next, the method 300 may include a step of aggregating the metadata and storing the aggregated metadata in a data warehouse, or the archive and litigation hold storage 20, using OLAP, as depicted in block 336. The aggregated data may be used for industry trending or fraud prevention.

Figure 4:
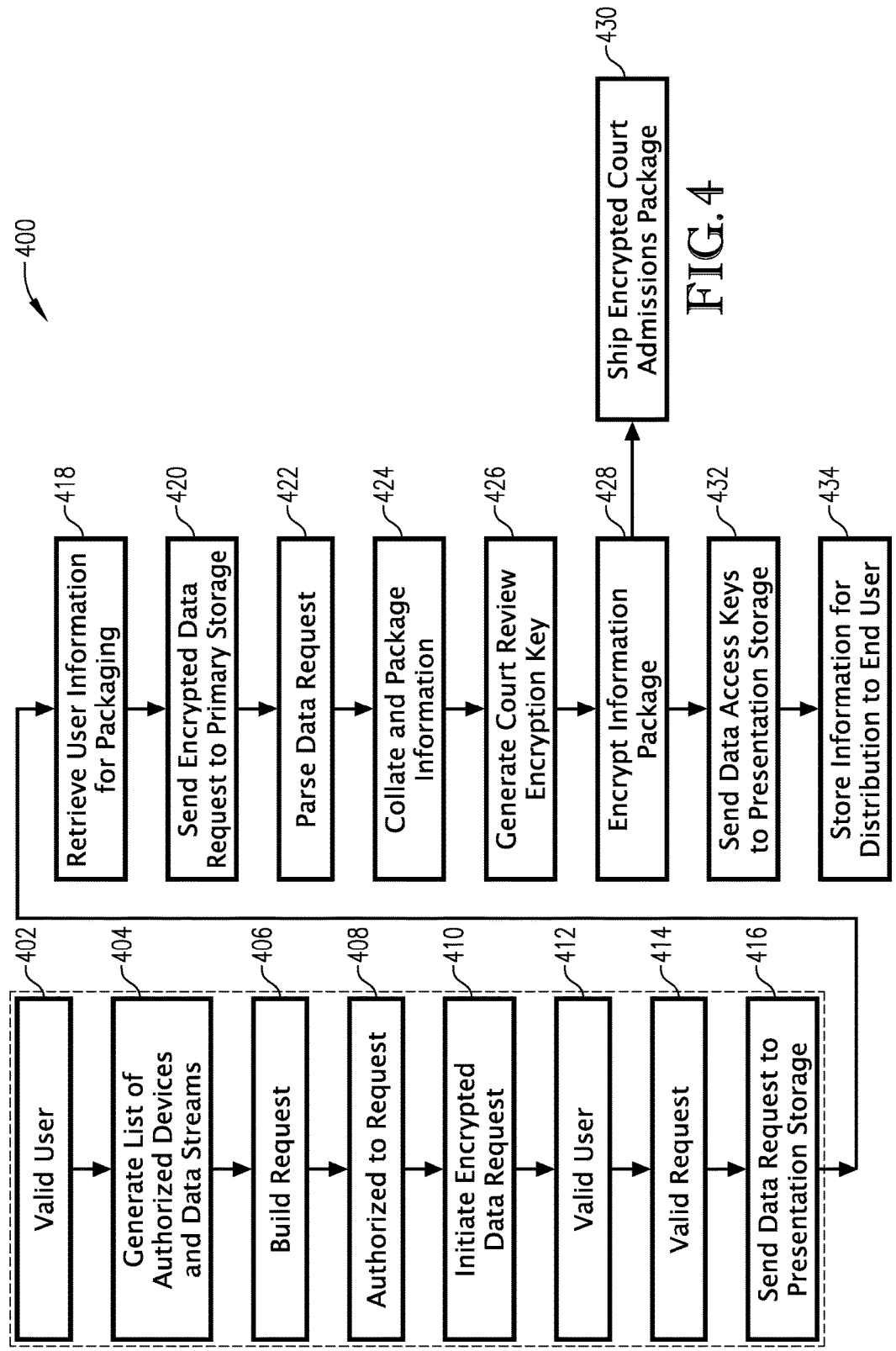
FIG. 4 is a flow chart depicting selected steps in a method of retrieving data in accordance with an embodiment of the present invention.

The flow chart of FIG. 4 depicts the steps of an exemplary method 400 for retrieving data using the system 10 to allow for secure retrieval of the data. In some alternative implementations, the functions noted in the various blocks may occur out of the order depicted in FIG. 4. For example, two blocks shown in succession in FIG. 4 may in fact be executed substantially concurrently, or the blocks may sometimes be executed in the reverse order depending upon the functionality involved. Some or all of the steps described below and illustrated in FIG. 4 may also represent executable code segments stored on a computer-readable medium described above and/or executable by a computer or processor.

The method 400 may comprise a step of verifying that the end user 28 is valid, as depicted in block 402. The system 10 may provide the end users 28 a login to a secure web presence, desktop application, or mobile application for the purpose of viewing reports, updating information, and requesting assistance. The system 10 may log all login attempts and data streams assigned to the end user 28. Next, the method 400 may include a step of generating a list of authorized devices 12, events, and data streams that are assigned to the end user 28, as depicted in block 404. Next, the method 400 may include a step of building a data request using the provided list, as depicted in block 406. The data request may include any information included in the authorized devices 12, the event, or the data streams. Next, the method 400 may include a step of verifying that the end user 28 has permissions and is authorized to make the data request, as depicted in block 408. Next, the method 400 may include a step of initiating the encrypted data request, as depicted in block 410. Authorized data requests may be initiated by the system 10 on behalf of the end user 28.

Next, the method 400 may include a step of verifying that the user 28 is authorized to ensure that all unauthorized use is prevented, as depicted in block 412. Next, the method 400 may include a step of verifying that the data request is a valid one to ensure that information is not spoofed or modified in an attempt to circumvent the information protection processes, as depicted in block 414. Next, the method 400 may include a step of sending the properly formatted data request to the presentation storage 24 for further processing. The previous steps of method 400 may be performed by the presentation device 26.

Next, the method 400 may include a step of retrieving user 28 information for packaging, as depicted in block 418. Information for the user may be retrieved to identify the user in the data request information package. The information may be used for report headers, report encryption, and report decommissioning timelines. Next, the method 400 may include a step of encrypting the data request and sending it to the primary storage 18, as depicted in block 420. Next, the method 400 may include a step of receiving the data request, decrypting the data request, and parsing the data request, as depicted in block 422. The primary storage 24 may be configured to parse the data request for user 28 information, device 12 information, and data stream information. Next, the method 400 may include a step of collating all data requested from the parsed data streams and the encrypted data streams and package the data for the user 28 using provided case numbers and report types, as depicted in blocks 424. The data may come from the primary storage 18 or the archive and litigation hold storage 20.

Next, the method 400 may include a step of retrieving the user 28 encryption key to ensure that the contents of the report are viewable only by the user 28, or generating a court review encryption key to ensure that the contents of the report are viewable only by the recipients identified in the data request by the user 28, such as a court, as depicted in block 426. Next, the method 400 may include a step of encrypting the requested data using the user 28 encryption key or the court review encryption key, as depicted in block 428. Next, the method 400 may include a step of sending the encrypted requested data via an approved transportation method to a specified court, as depicted in block 430. Next, the method 400 may include a step of sending the encrypted requested data to the presentation storage 24 for later presentation to the end user 28, as depicted in block 432. Next, the method 400 may include a step of storing the requested data on the presentation storage 24, as depicted in block 434. The amount of time in which the requested data is stored on the presentation storage 24 may be determined by the data request type or the scope of the permission granted to the user 28.

Figure 5:
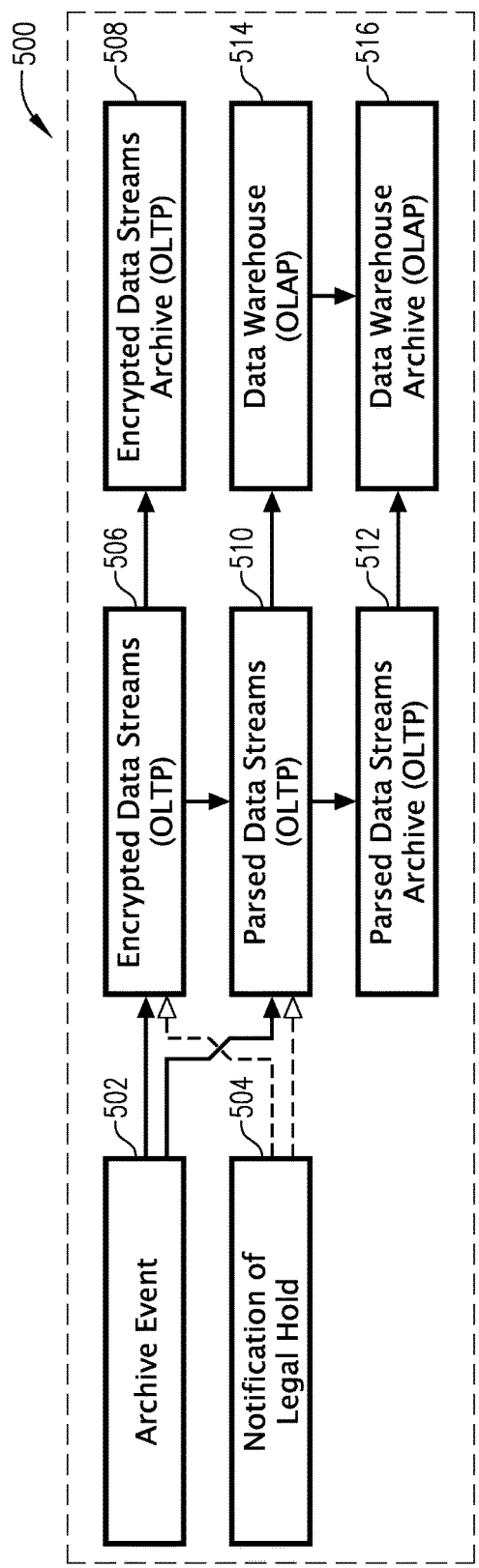
FIG. 5 is a flow chart depicting selected steps in a method of archiving data in accordance with an embodiment of the present invention.

The flow chart of FIG. 5 depicts the steps of an exemplary method 500 for archiving data using the system 10 to allow for secure storage of the data, especially the data with a litigation hold. In some alternative implementations, the functions noted in the various blocks may occur out of the order depicted in FIG. 5. For example, two blocks shown in succession in FIG. 5 may in fact be executed substantially concurrently, or the blocks may sometimes be executed in the reverse order depending upon the functionality involved. Some or all of the steps described below and illustrated in FIG. 5 may also represent executable code segments stored on a computer-readable medium described above and/or executable by a computer or processor.

The method 500 may include a step of triggering an archive event, as depicted in block 502. The archive event may be a time-based trigger that causes an automated process to migrate data from the primary storage 18 to the archive and litigation hold storage 20. Data migrated in this process may be subject to data lifecycle regulations and statute of limitation regulations. The archive events may trigger migrations for encrypted data streams, parsed data streams (or metadata), or data warehouse information. Next, the method 500 may include a step of triggering a litigation hold, as depicted in block 504. A litigation hold event may be a legal notice for the preservation of data related to a pending or probable lawsuit. Once a litigation hold has been triggered, data regarding the litigation hold is migrated from the primary storage 18 to the archive and litigation hold storage 20. Data migrated in this process may not be subject to the data lifecycle regulations and statute of limitation regulations and may be maintained until released by the attorneys in question or the closure of a lawsuit. A litigation hold event triggers migrations for encrypted data streams, metadata, and data warehouse information.

Next, the method 500 may include a step of migrating the encrypted data streams, in the case of a litigation hold or for an archive event, to the archive and litigation hold storage 20, as depicted in block 506. Next, the method 500 may include a step of archiving the encrypted data using OLTP, or other modern database techniques or processes as depicted in block 508. Next, the method 500 may include a step of migrating metadata to the archive and litigation hold storage 20, as depicted in block 510. Next, the method 500 may include a step of archiving the metadata using OLTP, or other modern database techniques or processes as depicted in block 512. Next, the method 500 may include a step of migrating data warehouse information to the archive and litigation hold storage 20, as depicted in block 514. Next, the method 500 may include a step of archiving the data warehouse information using OLAP, or other modern business intelligence techniques or processes as depicted in block 516.

Figure 6:
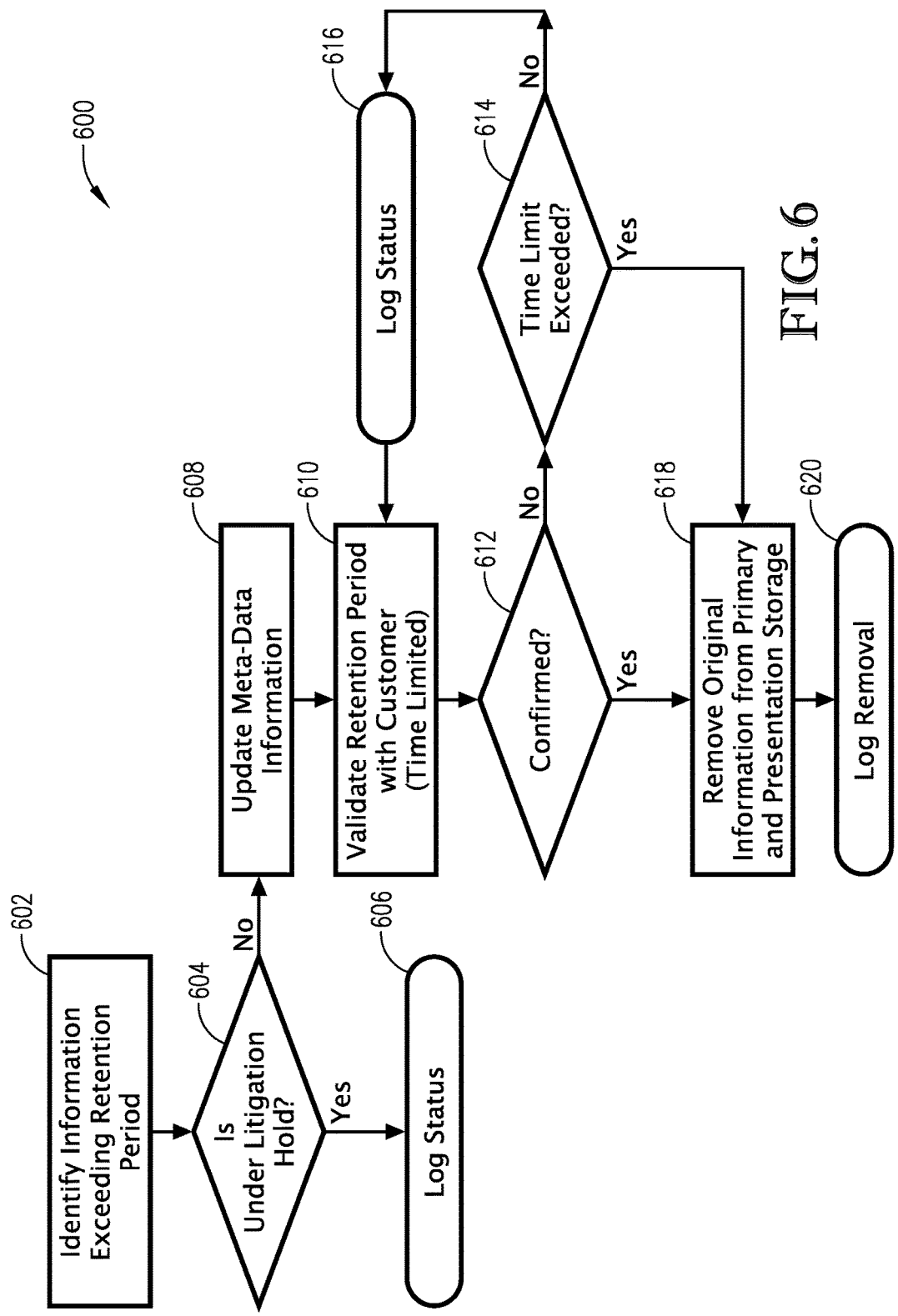
FIG. 6 is a flow chart depicting selected steps in a method of disposing of data in accordance with an embodiment of the present invention.

The flow chart of FIG. 6 depicts the steps of an exemplary method 600 for disposing of data using the system 10 to allow for safe disposal of the data. In some alternative implementations, the functions noted in the various blocks may occur out of the order depicted in FIG. 6. For example, two blocks shown in succession in FIG. 6 may in fact be executed substantially concurrently, or the blocks may sometimes be executed in the reverse order depending upon the functionality involved. Some or all of the steps described below and illustrated in FIG. 6 may also represent executable code segments stored on a computer-readable medium described above and/or executable by a computer or processor.

The method 600 may include a step of identifying data that may meet, exceed, or will soon exceed a predetermined retention period, as depicted in block 602. The retention period may be determined by the type of data, the customer, Federal or local rules of evidence, statutes of limitations, industry standards, or some other relevant standard. The data may be stored in the primary storage 18 or the presentation storage 24. Next, the method 600 may include a step of checking to see if the data is under a litigation hold, as depicted in block 604. Next, the method 600 may include a step of logging the status of the data if the data is under a litigation hold, as depicted in block 606. Next, the method 600 may include a step of annotating metadata to identify it as pending removal, as depicted in block 608. Next, the method 600 may include a step of notifying the user 28 of the pending removal of the user's 28 data, along with a time limit for responding, as depicted in block 610.

Next, the method 600 may include a step of determining whether the user 28 confirms that it is okay to remove the data, as depicted in block 612. If the user 28 does not confirm, then the method 600 checks to see if the time period has been exceeded, as depicted in block 614. If the time has not been exceeded, then the method 600 logs the status and goes back to waiting on the user 28 confirmation, as depicted in block 616. If the user 28 confirms that the data may be removed or if the time limit has been exceeded, then the system 10 removes the data from the primary storage 18 and the presentation storage 24, as depicted in block 618. However, metadata may remain in the system 10 for reporting, trend analysis, and auditing. Next, the method 600 may include a step of logging the removal of the data, as depicted in block 620.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A computer system for collecting, storing, certifying, and retrieving data for verification purposes, the system comprising:
   an input configured to receive, via a hardware input, data from a registered data capture device;
   a staging server configured to:
   receive the data from the input,
   verify that the data capture device is registered,
   assign a signature and an internal data hash to the data,
   encrypt the data and the internal data hash using an encryption key associated with the registered data capture device,
   transmit the encrypted data and the encrypted internal data hash to a data storage system using transit encryption, and
   verify a transmission hash to ensure proper transmission of the encrypted data and the encrypted internal data hash;
   a presentation system, which includes a computer component, configured to:
   receive a data request from an authorized user,
   encrypt the data request using an encryption key associated with the authorized user,
   transmit the encrypted data request to the data storage system,
   receive encrypted requested data, and
   decrypt the encrypted requested data using the encryption key associated with the authorized user; and
   the data storage system, which includes a data storage device, configured to:
   receive the encrypted data and the encrypted internal data hash from the staging server,
   decrypt the encrypted data and the encrypted internal data hash using a decryption key associated with the data capture device,
   verify that the transmission hash is not corrupted for incoming data streams,
   store the data,
   archive data that has a hold,
   dispose of data that does not have a hold and that has a retention time that has expired,
   receive the encrypted data request transmitted from the presentation system,
   decrypt the encrypted data request using a decryption key associated with the authorized user,
   retrieve requested data,
   assign an internal requested data hash to the requested data,
   encrypt the requested data and the internal requested data hash using the encryption key associated with the authorized user,
   transmit the encrypted requested data and the encrypted internal requested data hash using transit encryption, and
   verify the transmission hash to ensure that data remains uncorrupted during transit to the presentation system.

2. The computer system of claim 1, wherein the data storage system is configured to automatically archive a set of data when it is notified of a litigation hold on the set of data.

3. The computer system of claim 2, wherein the data storage system is configured to
   identify a retention length for a set of data;

determine whether the set of data has a litigation hold;
notify the user of a remaining time period for the retention length; and
remove the data set if it does not have a litigation hold and the retention length has expired.

4. The computer system of claim 1, the computer system further being controlled by a disinterested third party.

5. The computer system of claim 1, wherein the staging server is configured to parse the data into metadata, encrypt the metadata, and transmit the data and corresponding encrypted metadata to the data storage system.

6. The computer system of claim 5, wherein the data storage system is configured to decrypt the data and the encrypted metadata using the decryption key associated with the data capture device, aggregate the metadata, store the data and metadata using database techniques and processes, and store the aggregated metadata using business intelligence techniques and processes.

7. The computer system of claim 1, the computer system further comprising a key management system, which includes logic, configured to track all data capture devices and authorized users and their associated encryption keys and decryption keys.

8. The computer system of claim 1, wherein the input is an input processing application configured to authenticate and verify registration of data capture devices, process registration requests, and forward registered data packages to the staging server.

9. The computer system of claim 1, wherein the data storage system is configured to:
process a certified data request for court admissibility,
process a request for an uncertified copy of data,
retrieve the requested uncertified copy of data,
prepare a certification package,
notify an administrator for certification review,
package certification with expert review document for court submission,
encrypt the requested uncertified copy of data using an encryption key associated with the court submission, and
transmit the encrypted requested data to the presentation system wherein only authorized users having a decryption key associated with the court can decrypt and review the requested uncertified copy of data.

10. The computer system of claim 1, wherein the data storage system is configured to store the data in compliance with a predetermined standard.

11. The computer system of claim 10, wherein the predetermined standard is a legal evidentiary rule.

12. The computer system of claim 10, wherein the predetermined standard is an industry standard.

13. The computer system of claim 1, wherein the signature includes a time and date stamp.

14. The computer system of claim 1, wherein the signature includes a location and source stamp.

15. The computer system of claim 1, wherein the data storage system is configured to analyze the data to determine an industry trend.

16. The computer system of claim 1, wherein the data storage system tracks data submissions and data requests.

17. The computer system of claim 1, the computer system further comprising an application compatible with a desktop computer, a mobile device, and an internet browser, the application configured to allow a user to review uncertified data, request court certified copies of data, and add additional data to current customer cases.

18. A computer system for collecting, storing, certifying, and retrieving data for verification purposes, the system comprising:
an input configured to receive, via a hardware input, data from a registered data capture device;
a key management system that provides encryption keys;
a staging server configured to:
receive the data from the input,
verify that the data capture device is registered,
assign a signature and an internal data hash to the data,
parse the data into metadata,
encrypt the data, metadata, and the internal data hash using an encryption key associated with the registered data capture device and provided by the key management system,
transmit the encrypted data, the encrypted metadata, and the encrypted internal data hash to a data storage system using transit encryption, and
verify a transmission hash to ensure proper transmission of the encrypted data, the encrypted metadata, and the encrypted internal data hash;
a presentation system comprised of:
a presentation logic device configured to:
verify that a data request is from an authorized user,
verify that the data request is a valid data request, and
transmit the valid data request to a presentation storage device; and
the presentation storage device configured to:
receive the valid data request from the presentation logic device,
encrypt the valid data request using an encryption key associated with the authorized user and provided by the key management system,
transmit the encrypted data request to the data storage system,
receive encrypted requested data and encrypted metadata,
decrypt the encrypted requested data and encrypted metadata using a decryption key associated with the authorized user and provided by the key management system, and
store the requested data and metadata;
the data storage system comprising:
a primary storage device configured to:
receive the encrypted data, the encrypted metadata, and the encrypted internal data hash from the staging server,
decrypt the encrypted data, the encrypted metadata, and the encrypted internal data hash using a decryption key associated with the data capture device and provided by the key management system,
verify the transmission hash to ensure the incoming data stream is uncorrupted,
aggregate the metadata,
receive the encrypted valid data request from the presentation storage device,
decrypt the valid data request using the decryption key associated with the authorized user and provided by the key management system,
retrieve requested data and requested metadata,
assign an internal requested data hash to the requested data and requested metadata,
encrypt the requested data, requested metadata, and the internal requested data hash using the encryption key associated with the authorized user and provided by the key management system, transmit the encrypted requested data, the encrypted requested metadata, and the encrypted internal requested data hash using transit encryption via a transmission, verify the transmission hash to ensure proper transmission of the encrypted data, the encrypted metadata, and the encrypted internal requested data hash to the presentation system, store the data and metadata using database techniques and processes, and store the metadata using business intelligence techniques and processes; and an archive and litigation hold storage device configured to:

archive the data using database techniques and processes, the metadata using database techniques and processes, and the aggregated metadata using business intelligence techniques and processes, archive data and metadata that has a legal hold, and dispose data and metadata that does not have a legal hold and that has a retention time that has expired; and a client access portal configured to:

receive data from the input, send the data to the staging server, receive the data request from the user, and receive requested data and metadata to display for the user.

19. The computer system of claim 18, wherein the data storage system is controlled by a disinterested third party.

20. The computer system of claim 18, wherein the primary storage is configured to prepare data for certification review as requested by customers for court admissibility.

21. A method of collecting, storing, certifying, and retrieving data for verification purposes, the method comprising the steps of:

receiving, via a hardware input, data from a data capture device;

assigning, via a staging server, a signature and an internal data hash to the data;

parsing, via the staging server, the data into metadata;

encrypting, via the staging server, the data, metadata, and the internal data hash using an encryption key associated with the data capture device and transmitting the encrypted data, the encrypted metadata, and the encrypted internal data hash using transit encryption;

verifying, via the staging server, a transmission hash to ensure proper transmission of the encrypted data, the encrypted metadata, and the encrypted internal data hash;

decrypting, via a data storage system, the encrypted data, the encrypted metadata, and the encrypted internal data hash using a decryption key associated with the data capture device;

verifying, via the data storage system, that all transmission, storage, and certification hashes match during processing and handling of data requests;

aggregating, via the data storage system, the metadata;

storing, via the data storage system, the data and metadata using data base techniques and processes;

storing, via the data storage system, the aggregated metadata using business intelligence techniques and processes;

archiving, via the data storage system, the data using data base techniques and processes, the metadata using data base techniques and processes, and the aggregated metadata using business intelligence techniques and processes;

analyzing, via the data storage system, the metadata for industry trending and auditing;

archiving, via the data storage system, data, metadata, and aggregated metadata that has a legal hold;

disposing, via the data storage system, of data, metadata, and aggregated metadata that does not have a legal hold and that has a retention time that has expired;

verifying, via the data storage system, that a data request is from an authorized user;

verifying, via the data storage system, that the data request is a valid data request;

encrypting, via the data storage system, the valid data request using an encryption key associated with the authorized user;

decrypting, via the data storage system, the valid data request using a decryption key associated with the authorized user;

retrieving, via the data storage system, the requested data and requested metadata;

assigning an internal requested data hash to the requested data and requested metadata;

encrypting, via the data storage system, the requested data, the requested metadata, and the internal requested data hash using the encryption key associated with the authorized user and transmitting the encrypted requested data the encrypted requested metadata, and the encrypted internal requested data hash using transit encryption;

decrypting, via the data storage system, the encrypted requested data and the encrypted metadata using the decryption key associated with the authorized user;

displaying, via the data storage system, the requested data and the requested metadata; and certifying, via the data storage system, for originality and court admissibility of the data and metadata.

* * * * *